US012170092B2

(12) United States Patent
Fukui

(10) Patent No.: US 12,170,092 B2
(45) Date of Patent: Dec. 17, 2024

(54) SIGNAL PROCESSING DEVICE, METHOD, AND PROGRAM

(71) Applicant: Sony Group Corporation, Tokyo (JP)

(72) Inventor: Takao Fukui, Tokyo (JP)

(73) Assignee: Sony Group Corporation, Tokyo (JP)

( * ) Notice: Subject to any disclaimer, the term of this patent is extended or adjusted under 35 U.S.C. 154(b) by 199 days.

(21) Appl. No.: 17/434,696

(22) PCT Filed: Feb. 20, 2020

(86) PCT No.: PCT/JP2020/006789
§ 371 (c)(1),
(2) Date: Apr. 14, 2022

(87) PCT Pub. No.: WO2020/179472
PCT Pub. Date: Sep. 10, 2020

(65) Prior Publication Data

US 2022/0262376 A1 Aug. 18, 2022

(30) Foreign Application Priority Data

Mar. 5, 2019 (JP) ................................ 2019-039217

(51) Int. Cl.
*G10L 19/06* (2013.01)
*G10L 19/02* (2013.01)
*G10L 21/02* (2013.01)

(52) U.S. Cl.
CPC .............. *G10L 19/06* (2013.01); *G10L 19/02* (2013.01); *G10L 21/02* (2013.01)

(58) Field of Classification Search
CPC ....... G10L 19/06; G10L 19/02; G10L 19/008; G10L 19/00; G10L 19/04; G10L 17/26; G10L 21/02; G10L 21/0388; H04R 5/04
See application file for complete search history.

(56) References Cited

U.S. PATENT DOCUMENTS 7,283,961 B2 * 10/2007 Kondo .................... G10L 19/06 704/E19.041
8,099,275 B2 * 1/2012 Oshikiri .................. G10L 19/02 704/200

(Continued)

FOREIGN PATENT DOCUMENTS

CN 101501763 B * 9/2012 ............. G10L 19/26
CN 103548080 A * 1/2014 ............. G10L 19/04

(Continued)

OTHER PUBLICATIONS

International Search Report and English translation thereof mailed May 26, 2020 in connection with International Application No. PCT/JP2020/006789.

(Continued)

*Primary Examiner* — Richemond Dorvil
*Assistant Examiner* — Nadira Sultana
(74) *Attorney, Agent, or Firm* — Wolf, Greenfield & Sacks, P.C.

(57) ABSTRACT

The present technology relates to a signal processing device, a method, and a program that can obtain a signal with higher sound quality.
The signal processing device includes: a calculation unit that calculates a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal; a difference signal generation unit that generates the difference signal on the basis of the parameter and the input compressed sound source signal; and a synthesis unit that synthesizes the
(Continued)

generated difference signal and the input compressed sound source signal. The present technology can be applied to a signal processing device.

10 Claims, 14 Drawing Sheets

(56) References Cited

U.S. PATENT DOCUMENTS

| | | | | |
|---|---|---|---|---|
| 10,297,270 | B2 * | 5/2019 | Yamamoto | G10L 19/0208 |
| 2008/0091440 | A1 * | 4/2008 | Oshikiri | G10L 19/02 704/E19.01 |
| 2012/0243526 | A1 * | 9/2012 | Yamamoto | G10L 21/0388 370/343 |
| 2013/0028427 | A1 | 1/2013 | Yamamoto et al. | |
| 2013/0030818 | A1 | 1/2013 | Yamamoto et al. | |
| 2013/0202118 | A1 * | 8/2013 | Yamamoto | G10L 19/008 381/23 |
| 2015/0012030 | A1 | 1/2015 | Smith | |
| 2016/0019911 | A1 | 1/2016 | Yamamoto et al. | |
| 2016/0140982 | A1 | 5/2016 | Yamamoto et al. | |
| 2017/0229139 | A1 | 8/2017 | Yamamoto et al. | |
| 2017/0236530 | A1 | 8/2017 | Yamamoto et al. | |
| 2018/0330746 | A1 | 11/2018 | Yamamoto et al. | |
| 2019/0180768 | A1 | 6/2019 | Yamamoto et al. | |

FOREIGN PATENT DOCUMENTS

| | | | | |
|---|---|---|---|---|
| EP | 1484841 | A1 * | 12/2004 | G10L 19/00 |
| EP | 2418643 | A1 * | 2/2012 | G10L 17/26 |
| JP | 2011-237751 | A | 11/2011 | |
| JP | 2012032648 | * | 2/2012 | G10L 21/0208 |
| JP | 2013-007944 | A | 1/2013 | |
| TW | I426502 | B * | 2/2014 | H04R 5/04 |
| WO | WO 2006/046547 | A1 | 5/2006 | |

OTHER PUBLICATIONS

International Written Opinion and English translation thereof mailed May 26, 2020 in connection with International Application No. PCT/JP2020/006789.

International Preliminary Report on Patentability and English translation thereof mailed Sep. 16, 2021 in connection with International Application No. PCT/JP2020/006789.

* cited by examiner

SIGNAL PROCESSING DEVICE, METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/006789, filed in the Japanese Patent Office as a Receiving Office on Feb. 20, 2020, which claims priority to Japanese Patent Application Number JP2019-039217, filed in the Japanese Patent Office on Mar. 5, 2019, each of which is hereby incorporated by reference in its entirety.

TECHNICAL FIELD

The present technology relates to a signal processing device, a method, and a program, and more particularly to a signal processing device, a method, and a program that can obtain a signal with higher sound quality.

BACKGROUND ART

For example, when compression coding is performed on an original sound signal of music or the like, a high frequency component of the original sound signal is removed or the number of bits of the signal is compressed. Therefore, the sound quality of a compressed sound source signal obtained by further decoding code information obtained by compressing and coding the original sound signal is deteriorated as compared with the original sound quality of the original sound signal.

Therefore, a technique has been proposed in which the compressed sound source signal is filtered by a plurality of cascade-connected all-pass filters, gain adjustment is performed on a signal obtained as a result of the filtering, and the gain-adjusted signal and the compressed sound source signal are added to generate a signal with higher sound quality (see, for example, Patent Document 1).

CITATION LIST

Patent Document

Patent Document 1: Japanese Patent Application Laid-Open No. 2013-7944

SUMMARY OF THE INVENTION

Problems to be Solved by the Invention

Incidentally, in the case of improving the sound quality of the compressed sound source signal, it is conceivable to set the original sound signal, which is a signal before the deterioration of sound quality, as a target for improving the sound quality. That is, it can be considered that the closer the signal obtained from the compressed sound source signal is to the original sound signal, the higher the sound quality of the obtained signal is.

However, with the above-described technique, it is difficult to obtain, from the compressed sound source signal, a signal close to the original sound signal.

Specifically, with the above-described technique, a gain value at the time of gain adjustment is optimized manually in consideration of a compression coding method (type of compression coding), a bit rate of the code information obtained by the compression coding, and the like.

That is, sound of the signal whose sound quality is improved by use of the gain value determined manually and original sound of the original sound signal are compared by audition, a process of manually adjusting the gain value is repeated after the audition, and the final gain value is determined. Therefore, it is difficult to obtain, only by human senses, the signal close to the original sound signal from the compressed sound source signal.

The present technology has been made in view of such a situation, and makes it possible to obtain a signal with higher sound quality.

Solutions to Problems

A signal processing device of one aspect of the present technology includes: a calculation unit that calculates a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal; a difference signal generation unit that generates the difference signal on the basis of the parameter and the input compressed sound source signal; and a synthesis unit that synthesizes the generated difference signal and the input compressed sound source signal.

A signal processing method or a program of one aspect of the present technology includes steps of: calculating a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal; generating the difference signal on the basis of the parameter and the input compressed sound source signal; and synthesizing the generated difference signal and the input compressed sound source signal.

In one aspect of the present technology, a parameter for generating a difference signal corresponding to an input compressed sound source signal is calculated on the basis of a prediction coefficient and the input compressed sound source signal, the prediction coefficient being obtained by learning using, as training data, a difference signal between an original sound signal and a learning compressed sound source signal obtained by compressing and coding the original sound signal, the difference signal is generated on the basis of the parameter and the input compressed sound source signal, and the generated difference signal and the input compressed sound source signal are synthesized.

MODE FOR CARRYING OUT THE INVENTION

Hereinafter, embodiments to which the present technology is applied will be described with reference to the drawings.

First Embodiment

Outline of Present Technology

The present technology can improve the sound quality of a compressed sound source signal by generating, from the compressed sound source signal, a difference signal between the compressed sound source signal and an original sound signal by prediction and synthesizing the obtained difference signal with the compressed sound source signal.

In the present technology, a prediction coefficient used for predicting an envelope of frequency characteristics of the difference signal for improving the sound quality is generated by machine learning using the difference signal as training data.

First, the outline of the present technology will be described.

In the present technology, for example, a linear pulse code modulation (LPCM) signal of music or the like is used as the original sound signal. Hereinafter, the original sound signal particularly used for machine learning will also be referred to as a learning original sound signal.

Furthermore, a signal obtained by compressing and coding the original sound signal by a predetermined compression coding method such as Advanced Audio Coding (AAC) and decoding (decompressing) code information obtained as a result of the compression coding is used as the compressed sound source signal.

Hereinafter, a compressed sound source signal particularly used for machine learning will also be referred to as a learning compressed sound source signal, and a compressed sound source signal whose sound quality is actually to be improved will also be referred to as an input compressed sound source signal.

Figure 1:
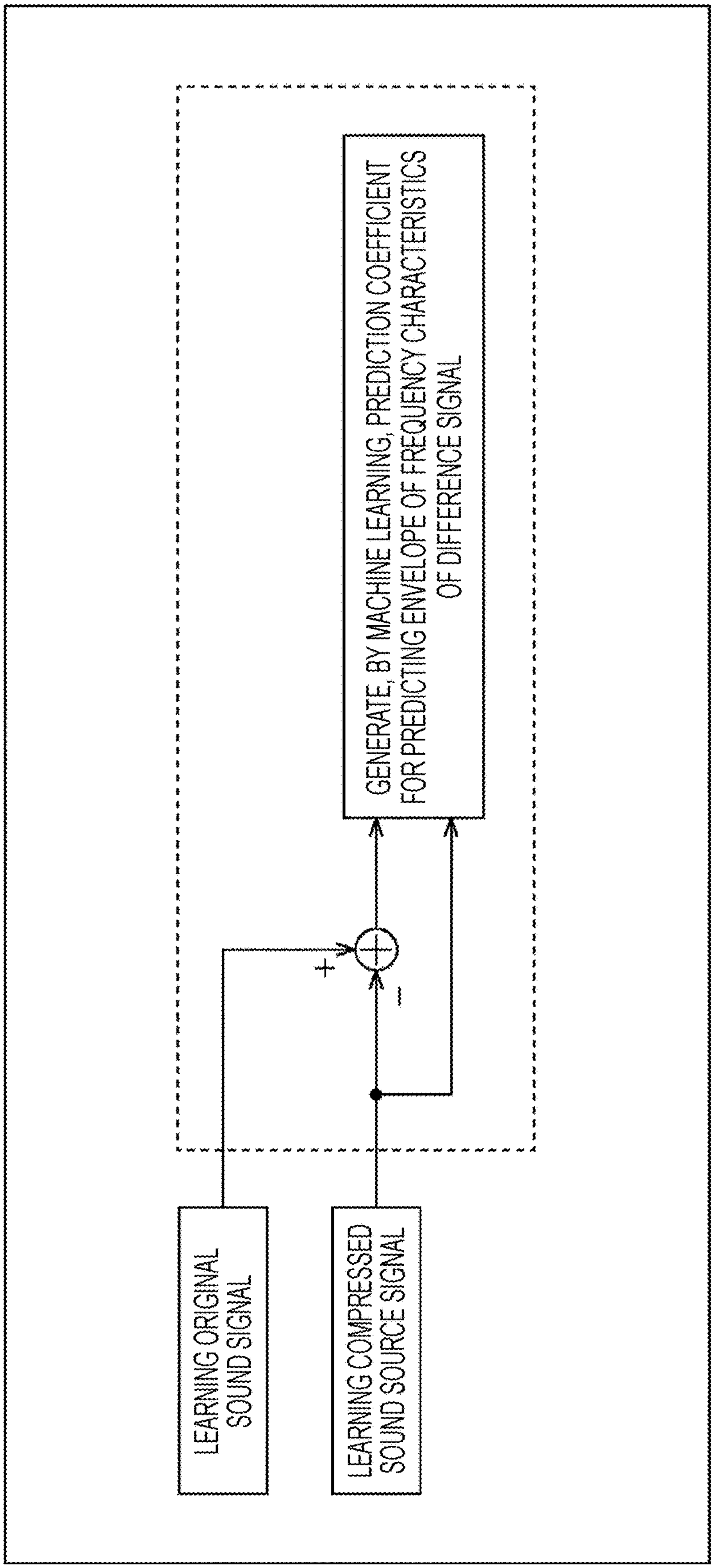
FIG. 1 is a diagram for describing machine learning.

In the present technology, for example, as illustrated in FIG. 1, a difference between the learning original sound signal and the learning compressed sound source signal is obtained as a difference signal, and machine learning is performed using the difference signal and the learning compressed sound source signal. At this time, the difference signal is used as the training data.

In machine learning, the prediction coefficient for predicting the envelope of the frequency characteristics of the difference signal is generated from the learning compressed sound source signal. With the prediction coefficient obtained in this way, a predictor that predicts the envelope of the frequency characteristics of the difference signal is implemented. In other words, the prediction coefficient that constitutes the predictor is generated by machine learning.

Figure 2:
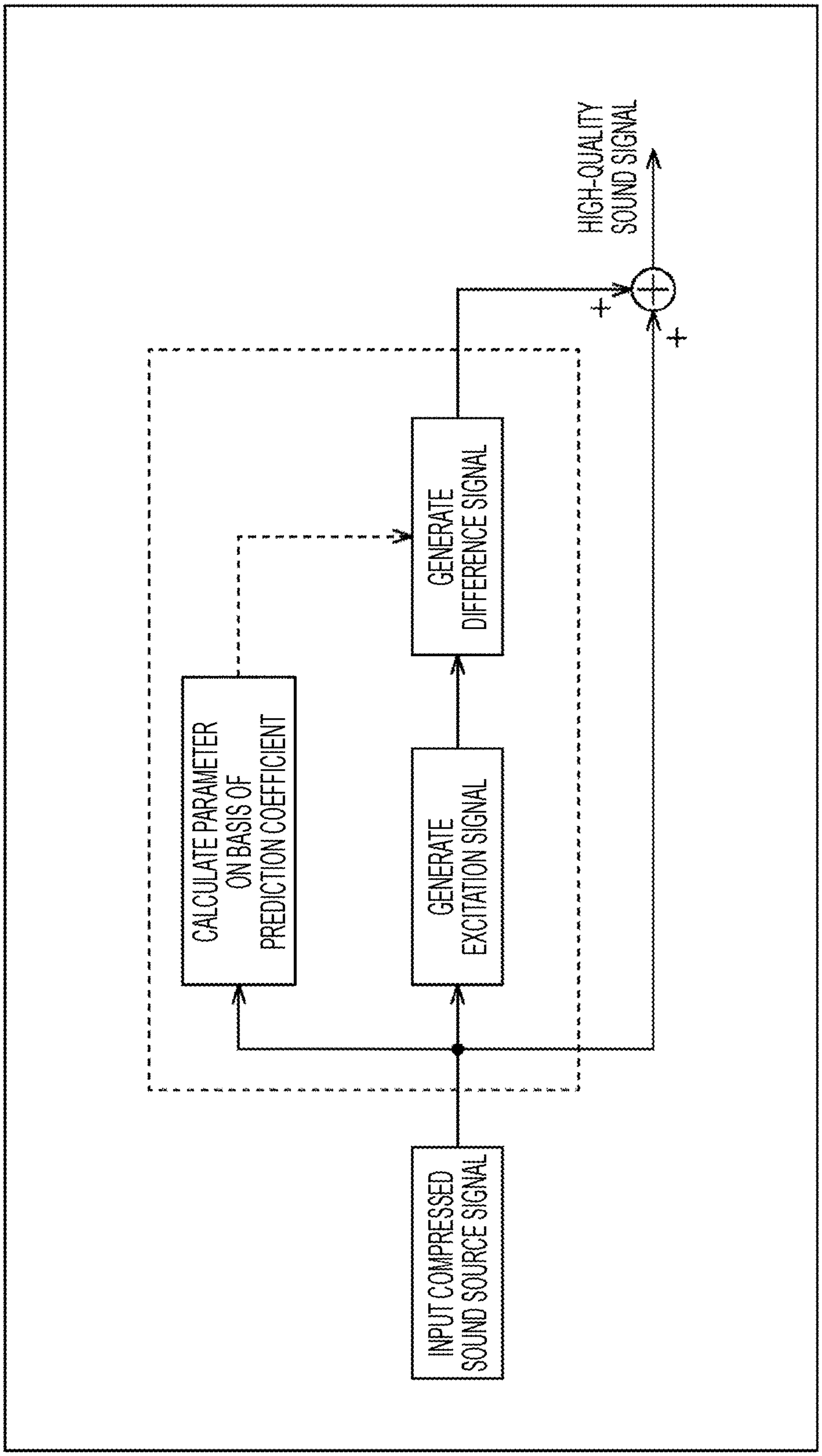
FIG. 2 is a diagram for describing generation of a high-quality sound signal.

When the prediction coefficient is obtained, for example, as illustrated in FIG. 2, the obtained prediction coefficient is used to improve the sound quality of the input compressed sound source signal, so that a high-quality sound signal is generated.

That is, in the example illustrated in FIG. 2, sound quality improvement processing for improving the sound quality of the input compressed sound source signal is performed as necessary, so that an excitation signal is generated.

Furthermore, prediction calculation processing is performed on the basis of the input compressed sound source signal and the prediction coefficient obtained by machine learning, so that the envelope of the frequency characteristics of the difference signal is obtained, and a parameter for generating the difference signal is calculated (generated) on the basis of the obtained envelope.

Here, a gain value for adjusting a gain of the excitation signal in a frequency domain, that is, a gain of the frequency envelope of the difference signal is calculated as the parameter for generating the difference signal.

When the parameter is calculated in this way, the difference signal is generated on the basis of the parameter and the excitation signal.

Note that, although an example in which the sound quality improvement processing is performed on the input compressed sound source signal has been described here, the sound quality improvement processing does not necessarily have to be performed, and the difference signal may be generated on the basis of the input compressed sound source signal and the parameter. In other words, the input compressed sound source signal itself may be used as the excitation signal.

When the difference signal is obtained, the difference signal and the input compressed sound source signal are then synthesized (added) to generate the high-quality sound signal as the input compressed sound source signal whose sound quality is improved.

For example, assuming that the excitation signal is the input compressed sound source signal itself and there is no prediction error, the high-quality sound signal as the sum of the difference signal and the input compressed sound source signal is the original sound signal on which the input compressed sound source signal is based, and thus a signal with high sound quality is obtained.

About Machine Learning

Then, machine learning of the prediction coefficient, that is, the predictor and the generation of the high-quality sound signal using the prediction coefficient will be described in more detail below.

First, machine learning will be described.

In machine learning of the prediction coefficient, the learning original sound signal and the learning compressed sound source signal are generated in advance for many sound sources of music, such as 900 musical pieces, for example.

For example, here, the learning original sound signal is an LPCM signal. Furthermore, for example, the learning original sound signal is compressed and coded by the AAC at 128 kbps, which is widely used in general, that is, by the AAC method to obtain a bit rate of 128 kbps after compression, and a signal obtained by decoding code information obtained by the compression coding is used as the learning compressed sound source signal.

When a set of the learning original sound signal and the learning compressed sound source signal is obtained in this way, a fast Fourier transform (FFT) is performed on the learning original sound signal and the learning compressed sound source signal, for example, with 2048 taps of half overlap.

An envelope of frequency characteristics is then generated on the basis of a signal obtained by the FFT.

Here, for example, a scale factor band (hereinafter referred to as an SFB) used for energy calculation in the AAC is used to group the entire frequency band into 49 bands (SFBs).

In other words, the entire frequency band is divided into 49 SFBs. In this case, an SFB on the higher frequency side has a wider frequency bandwidth (bandwidth).

For example, in a case where the sampling frequency of the learning original sound signal is 44.1 kHz, when the FFT is performed with 2048 taps, an interval between frequency bins of the signal obtained by the FFT is (44100/2)/1024=21.5 Hz.

Note that, hereinafter, an index indicating a frequency bin of the signal obtained by the FFT will be denoted by I, and the frequency bin indicated by the index I will also be referred to as a frequency bin I.

Furthermore, hereinafter, an index indicating an SFB will be denoted by n (where n is 0, 1, . . . , 48). That is, the index n indicates that the SFB indicated by the index n is an n-th SFB from the low frequency side in the entire frequency band.

Therefore, for example, the lower limit frequency and the upper limit frequency of a zeroth SFB (n=0) are 0.0 Hz and 86.1 Hz, respectively, and thus the zeroth SFB contains four frequency bins I.

Similarly, a first SFB also contains four frequency bins I. Furthermore, an SFB on the higher frequency side contains a larger number of frequency bins I. For example, a 48th SFB on the highest frequency side contains 96 frequency bins I.

When the FFT is performed on each of the learning original sound signal and the learning compressed sound source signal, an average energy of the signal is calculated in 49 band units, that is, in SFB units, on the basis of the signal obtained by the FFT, so that the envelope of the frequency characteristics is obtained.

Specifically, for example, Equation (1) shown below is calculated, so that an envelope SFB[n] of frequency characteristics for the n-th SFB from the low frequency side is calculated.

[Math. 1]

$$SFB[n]=10\times\log 10(P[n]) \tag{1}$$

Note that P[n] in Equation (1) indicates the root mean square of the amplitude of the n-th SFB, which is obtained by Equation (2) shown below.

[Math. 2]

$$P[n]=\sum_{I=FL[n]}^{FH[n]}\left(a[I]^2+b[I]^2\right)/BW[n] \tag{2}$$

In Equation (2), a[I] and b[I] indicate Fourier coefficients, and when the imaginary number is j, in the FFT, a[I]+b[I]×j is obtained as a result of the FFT for the frequency bin I.

Furthermore, in Equation (2), FL[n] and FH[n] indicate the lower limit point and the upper limit point in the n-th SFB, that is, the frequency bin I having the lowest frequency and the frequency bin I having the highest frequency contained in the n-th SFB.

Moreover, in Equation (2), BW[n] is the number of frequency bins I (number of bins) contained in the n-th SFB, and BW[n]=FH[n]−FL[n]−1 is established.

Figure 3:
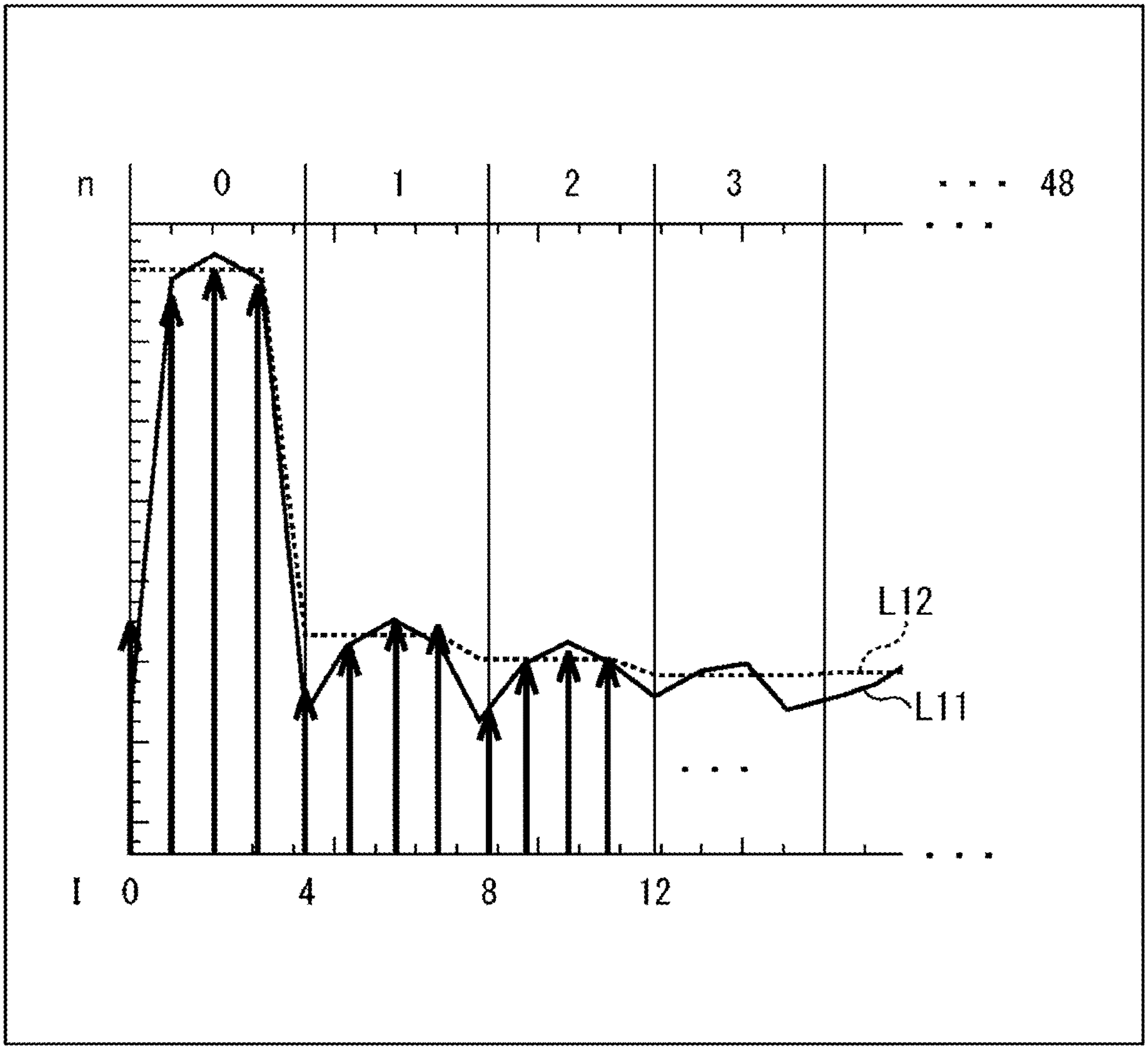
FIG. 3 is a diagram for describing an envelope of frequency characteristics.

As described above, Equation (1) is calculated for each SFB for each signal, so that an envelope of frequency characteristics illustrated in FIG. 3 is obtained.

Note that, in FIG. 3, the horizontal axis indicates a frequency and the vertical axis indicates a gain (level) of the signal. In particular, each number shown on the lower side of the horizontal axis in the drawing indicates the frequency bin I (index I), and each number shown on the upper side of the horizontal axis in the drawing indicates the index n.

For example, in FIG. 3, a polygonal line L11 indicates the signal obtained by the FFT, and an upward arrow in the drawing represents the energy in a corresponding frequency bin I with the arrow, that is, $a[I]^2+b[I]^2$ in Equation (2). Furthermore, a polygonal line L12 indicates the envelope SFB[n] of the frequency characteristics for each SFB.

At the time of machine learning of the prediction coefficient, the envelope SFB[n] of the frequency characteristics as described above is obtained for each of a plurality of learning original sound signals and a plurality of learning compressed sound source signals.

Note that, hereinafter, an envelope SFB[n] of frequency characteristics obtained particularly for the learning original sound signal will be denoted by SFBpcm[n] in particular, and an envelope SFB[n] of frequency characteristics obtained for the learning compressed sound source signal will be denoted by SFBaac[n] in particular.

Here, in machine learning, an envelope SFBdiff[n] of the frequency characteristics of the difference signal, which is the difference between the learning original sound signal and the learning compressed sound source signal, is used as the training data, and this envelope SFBdiff[n] can be obtained by calculating Equation (3) shown below.

[Math. 3]

$$SFBdiff[n]=SFBpcm[n]-SFBaac[n] \tag{3}$$

In Equation (3), the envelope SFBaac[n] of the frequency characteristics of the learning compressed sound source signal is subtracted from the envelope SFBpcm[n] of the frequency characteristics of the learning original sound signal, so that the envelope SFBdiff[n] of the frequency characteristics of the difference signal is obtained.

As described above, the learning compressed sound source signal is obtained by compressing and coding the learning original sound signal by the AAC method, but in the AAC, band components of the signal having a frequency equal to or higher than a predetermined frequency, specifically, frequency band components of about 11 kHz to 14 kHz are all removed during the compression coding.

Hereinafter, a frequency band removed in the AAC or a part of the frequency band will be referred to as a high frequency band, and a frequency band not removed in the AAC will be referred to as a low frequency band.

Generally, when the compressed sound source signal is reproduced, band expansion processing is performed to generate a high frequency component, and thus it is assumed here that machine learning is performed with the low frequency band as a frequency band to be processed.

Specifically, in the above example, a frequency band from the zeroth SFB to a 35th SFB is the frequency band to be processed, that is, the low frequency band.

Therefore, at the time of machine learning, the envelope SFBdiff[n] and the envelope SFBaac[n] obtained for the zeroth to 35th SFBs are used.

That is, for example, the envelope SFBdiff[n] is used as the training data, and machine learning generates the predictor that predicts, with the envelope SFBaac[n] as input data, the envelope SFBdiff[n] by appropriately combining linear prediction, non-linear prediction, a deep neural network (DNN), a neural network (NN), and the like.

In other words, machine learning generates the prediction coefficient used for prediction calculation in predicting the envelope SFBdiff[n] by any one of a plurality of prediction methods such as linear prediction, non-linear prediction, DNN, and NN, or by a prediction method that combines any multiple methods of the plurality of prediction methods.

As a result, the prediction coefficient for predicting the envelope SFBdiff[n] from the envelope SFBaac[n] is obtained.

Note that the prediction method and learning method for the envelope SFBdiff[n] are not limited to the above-described prediction method and machine learning method, and may be any other methods.

When the high-quality sound signal is generated, the prediction coefficient obtained in this way is used to predict the envelope of the frequency characteristics of the difference signal from the input compressed sound source signal, and the obtained envelope is used to improve the sound quality of the input compressed sound source signal.

About Generation of High-Quality Sound Signal

Configuration Example of Signal Processing Device

Next, the improvement of the sound quality of the input compressed sound source signal, that is, the generation of the high-quality sound signal will be described.

First, an example will be described in which frequency characteristics of the predicted envelope are added to the input compressed sound source signal itself without performing the sound quality improvement processing, that is, without generating the excitation signal.

Figure 4:
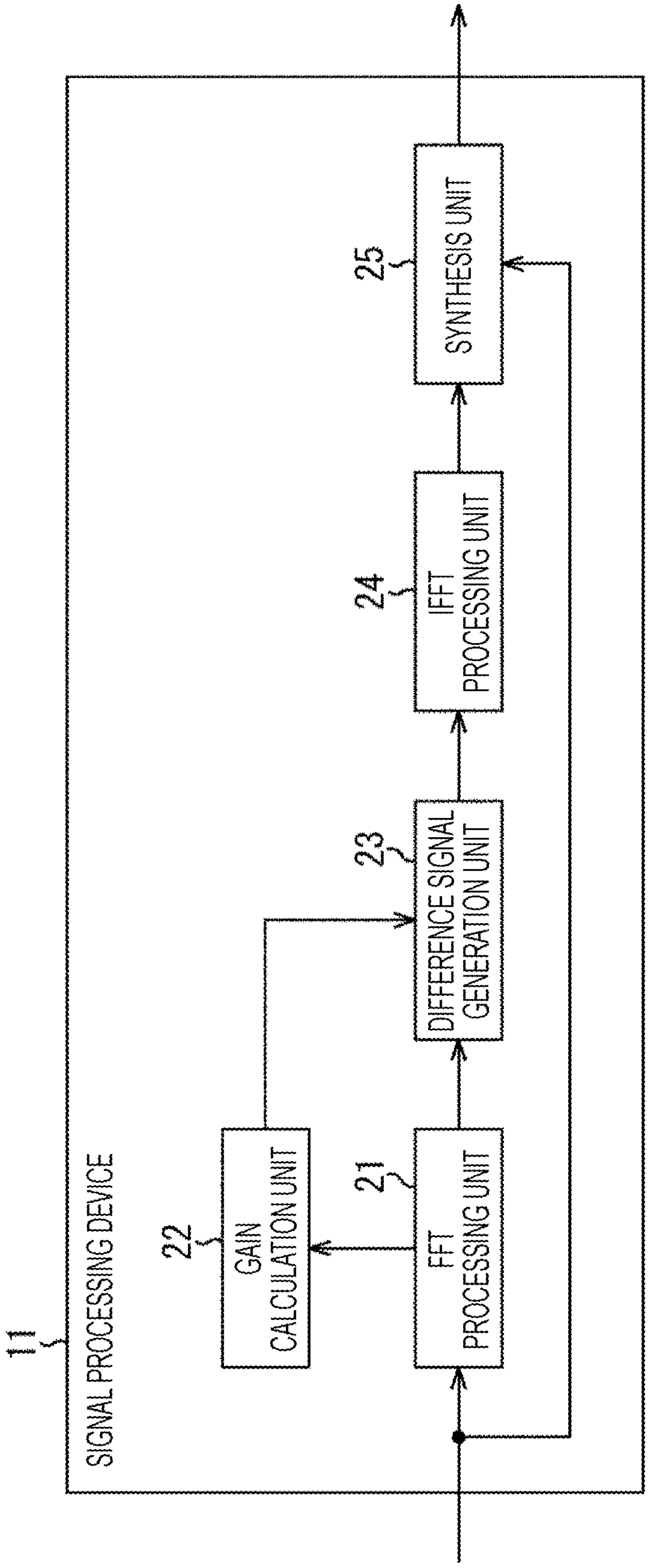
FIG. 4 is a diagram illustrating a configuration of a signal processing device.

In such a case, a signal processing device to which the present technology is applied is configured as illustrated in FIG. 4, for example.

A signal processing device 11 illustrated in FIG. 4 receives, as an input, the input compressed sound source signal whose sound quality is to be improved, and outputs the high-quality sound signal obtained by improving the sound quality of the input compressed sound source signal.

The signal processing device 11 includes an FFT processing unit 21, a gain calculation unit 22, a difference signal generation unit 23, an IFFT processing unit 24, and a synthesis unit 25.

The FFT processing unit 21 performs the FFT on the supplied input compressed sound source signal, and supplies a signal obtained as a result of the FFT to the gain calculation unit 22 and the difference signal generation unit 23.

The gain calculation unit 22 holds the prediction coefficient for obtaining, by prediction, the envelope SFBdiff[n] of the frequency characteristics of the difference signal, which is obtained in advance by machine learning.

The gain calculation unit 22 calculates the gain value as the parameter for generating the difference signal corresponding to the input compressed sound source signal on the basis of the held prediction coefficient and the signal supplied from the FFT processing unit 21, and supplies the gain value to the difference signal generation unit 23. That is, the gain of the frequency envelope of the difference signal is calculated as the parameter for generating the difference signal.

The difference signal generation unit 23 generates the difference signal on the basis of the signal supplied from the FFT processing unit 21 and the gain value supplied from the gain calculation unit 22, and supplies the difference signal to the IFFT processing unit 24.

The IFFT processing unit 24 performs an IFFT on the difference signal supplied from the difference signal generation unit 23, and supplies, to the synthesis unit 25, a difference signal in a time domain, which is obtained as a result of the IFFT.

The synthesis unit 25 synthesizes the supplied input compressed sound source signal and the difference signal supplied from the IFFT processing unit 24, and outputs the high-quality sound signal obtained as a result of the synthesis to a subsequent stage.

Description of Signal Generation Processing

Next, the operation of the signal processing device 11 will be described.

When the input compressed sound source signal is supplied, the signal processing device 11 performs signal generation processing to generate the high-quality sound signal. Hereinafter, the signal generation processing by the signal processing device 11 will be described with reference to a flowchart of FIG. 5.

In step S11, the FFT processing unit 21 performs the FFT on the supplied input compressed sound source signal, and supplies the signal obtained as a result of the FFT to the gain calculation unit 22 and the difference signal generation unit 23.

For example, in step S11, the FFT is performed with 2048 taps of half overlap on the input compressed sound source signal having 1024 samples in one frame. The input compressed sound source signal is converted by the FFT from a signal in the time domain (time axis) to a signal in the frequency domain.

In step S12, the gain calculation unit 22 calculates the gain value on the basis of the prediction coefficient held in advance and the signal supplied from the FFT processing unit 21, and supplies the gain value to the difference signal generation unit 23.

Specifically, the gain calculation unit 22 calculates Equation (1) described above for each SFB on the basis of the signal supplied from the FFT processing unit 21, and calculates the envelope SFBaac[n] of the frequency characteristics of the input compressed sound source signal.

Furthermore, the gain calculation unit 22 performs the prediction calculation based on the obtained envelope SFBaac[n] and the held prediction coefficient, to obtain the envelope SFBdiff[n] of the frequency characteristics of the difference signal between the input compressed sound source signal and the original sound signal on which the input compressed sound source signal is based.

Moreover, the gain calculation unit 22 sets a value of $(P[n])^{1/2}$ as the gain value for each of the 36 SFBs from the zeroth SFB to the 35th SFB, for example, on the basis of the envelope SFBdiff[n].

Note that an example of performing machine learning of the prediction coefficient for obtaining the envelope SFBdiff[n] by prediction has been described here. However, in addition, for example, the envelope SFBaac[n] may be input, and the prediction coefficient (predictor) for obtaining the gain value by the prediction calculation may be obtained by machine learning. In such a case, the gain calculation unit 22 can directly obtain the gain value by the prediction calculation based on the prediction coefficient and the envelope SFBaac[n].

In step S13, the difference signal generation unit 23 generates the difference signal on the basis of the signal supplied from the FFT processing unit 21 and the gain value supplied from the gain calculation unit 22, and supplies the difference signal to the IFFT processing unit 24.

Specifically, for example, the difference signal generation unit 23 multiplies the signal obtained by the FFT by the gain value supplied from the gain calculation unit 22 for each SFB, and thus adjusts the gain of the signal in the frequency domain.

As a result, the frequency characteristics of the envelope obtained by the prediction, that is, the frequency characteristics of the difference signal can be added to the input compressed sound source signal while the phase of the input compressed sound source signal is maintained, that is, without changing the phase.

Furthermore, here, an example in which the half overlap FFT is performed in step S11 is described. Therefore, when the difference signal is generated, a difference signal obtained for a current frame and a difference signal obtained for a frame that is earlier in time than the current frame are substantially cross-faded. Note that processing of actually cross-fading difference signals of two consecutive frames may be performed.

When the gain adjustment is performed in the frequency domain, the difference signal in the frequency domain is obtained. The difference signal generation unit 23 supplies the obtained difference signal to the IFFT processing unit 24.

In step S14, the IFFT processing unit 24 performs the IFFT on the difference signal in the frequency domain, which is supplied from the difference signal generation unit 23, and supplies, to the synthesis unit 25, the difference signal in the time domain, which is obtained as a result of the IFFT.

In step S15, the synthesis unit 25 adds the supplied input compressed sound source signal and the difference signal supplied from the IFFT processing unit 24 to synthesize the input compressed sound source signal and the difference signal, and outputs the high-quality sound signal obtained as a result of the synthesis to the subsequent stage, to end the signal generation processing.

As described above, the signal processing device 11 generates the difference signal on the basis of the input compressed sound source signal and the prediction coefficient held in advance, and synthesizes the obtained difference signal and the input compressed sound source signal to improve the sound quality of the input compressed sound source signal.

As described above, generating the difference signal by use of the prediction coefficient to improve the sound quality of the input compressed sound source signal makes it possible to obtain the high-quality sound signal close to the original sound signal. That is, it is possible to obtain a signal with higher sound quality, which is close to the original sound signal.

Moreover, according to the signal processing device 11, even if the bit rate of the input compressed sound source signal is low, it is possible to obtain the high-quality sound signal close to the original sound signal by use of the prediction coefficient. Therefore, for example, even in a case where a compression rate of an audio signal is further increased in the future for multi-channel distribution, object audio distribution, or the like, it is possible to reduce the bit rate of the input compressed sound source signal without deteriorating the sound quality of the high-quality sound signal obtained as an output.

Second Embodiment

Configuration Example of Signal Processing Device

Note that the prediction coefficient for obtaining, by prediction, the envelope SFBdiff[n] of the frequency characteristics of the difference signal may be learned, for example, for each type of sound based on the original sound signal (input compressed sound source signal), that is, for each genre of music, for each compression coding method in compressing and coding the original sound signal, for each bit rate of the code information (input compressed sound source signal) after the compression coding, or the like.

For example, if machine learning of the prediction coefficient is performed for each genre of music such as classic, jazz, male vocal, and JPOP, and the prediction coefficient is switched for each genre, the envelope SFBdiff[n] can be predicted with higher accuracy.

Similarly, the envelope SFBdiff[n] can be predicted with higher accuracy if the prediction coefficient is switched for each compression coding method or for each bit rate of the code information.

Figure 6:
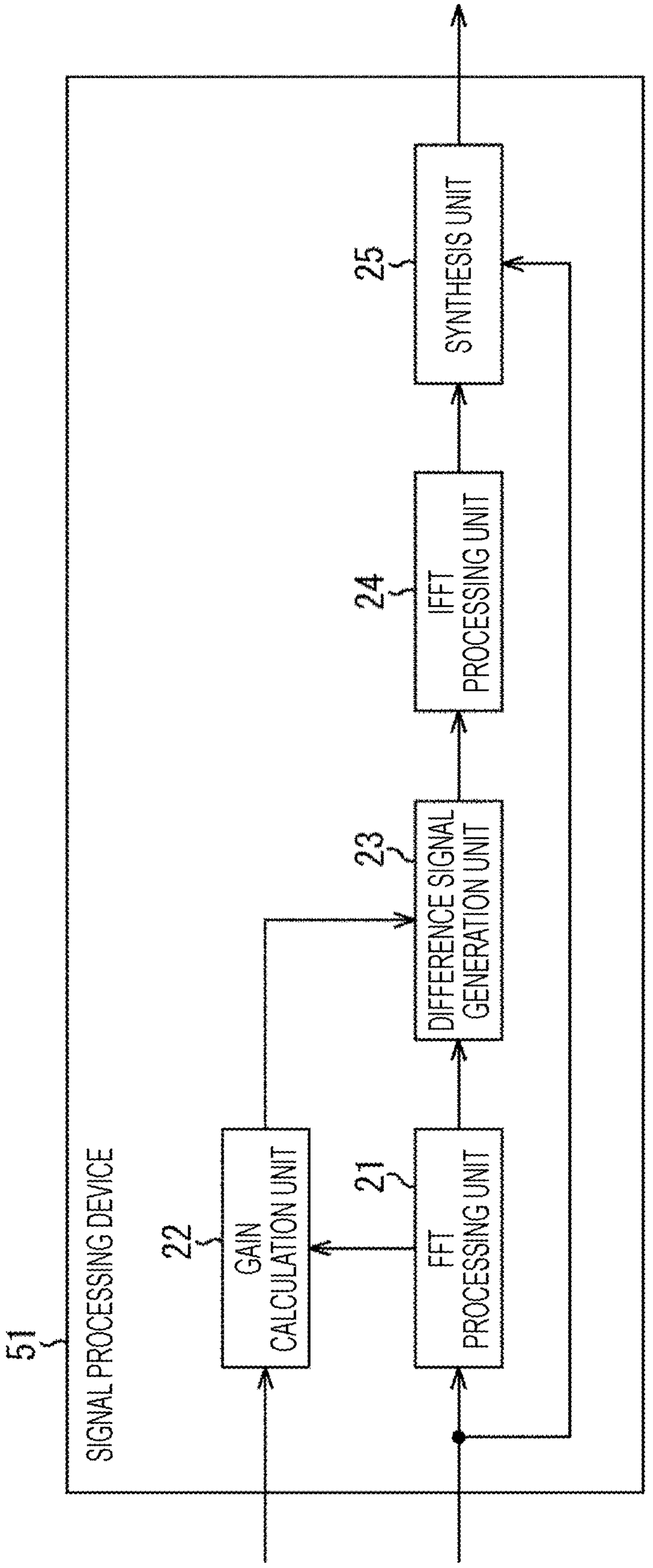
FIG. 6 is a diagram illustrating a configuration of a signal processing device.

As described above, in a case where an appropriate prediction coefficient is selected from among a plurality of prediction coefficients to be used, a signal processing device is configured as illustrated in FIG. 6. Note that, in FIG. 6, the same reference signs are given to parts corresponding to the parts in the case of FIG. 4, and a description thereof will be omitted as appropriate.

A signal processing device 51 illustrated in FIG. 6 includes an FFT processing unit 21, a gain calculation unit 22, a difference signal generation unit 23, an IFFT processing unit 24, and a synthesis unit 25.

A configuration of the signal processing device 51 is basically the same as the configuration of the signal processing device 11, but the signal processing device 51 is different from the signal processing device 11 in that metadata is supplied to the gain calculation unit 22.

In this example, on the side of the compression coding of the original sound signal, metadata is generated that includes compression coding method information indicating the compression coding method at the time of compression coding of the original sound signal, bit rate information indicating the bit rate of the code information obtained by the compression coding, and genre information indicating the genre of the sound (music) based on the original sound signal.

A bit stream in which the obtained metadata and the code information are multiplexed is then generated, and the bit stream is transmitted from the compression coding side to the decoding side.

Note that, here, an example will be described in which the metadata includes the compression coding method information, the bit rate information, and the genre information, but the metadata is only required to include at least any one of the compression coding method information, the bit rate information, or the genre information.

Furthermore, on the decoding side, the code information and the metadata are extracted from the bit stream received from the compression coding side, and the extracted metadata is supplied to the gain calculation unit 22.

Moreover, an input compressed sound source signal obtained by decoding the extracted code information is supplied to the FFT processing unit 21 and the synthesis unit 25.

The gain calculation unit 22 holds in advance a prediction coefficient generated by machine learning for each combination of, for example, the genre of music, the compression coding method, and the bit rate of the code information.

The gain calculation unit 22 selects, on the basis of the supplied metadata, a prediction coefficient to be actually used for predicting the envelope SFBdiff[n] from among these prediction coefficients.

Description of Signal Generation Processing

Figure 7:
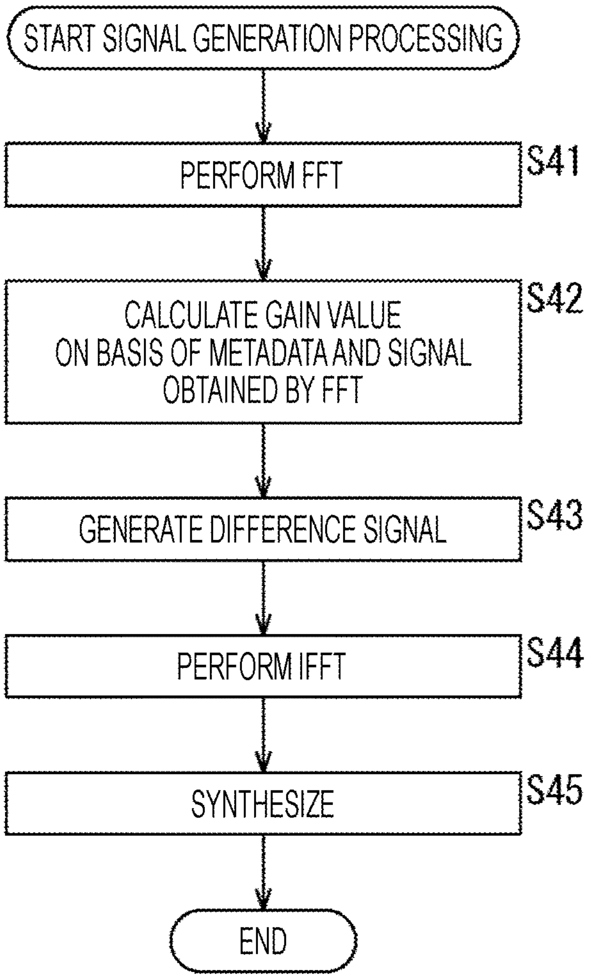
FIG. 7 is a flowchart for describing signal generation processing.

Subsequently, signal generation processing performed by the signal processing device 51 will be described with reference to a flowchart of FIG. 7.

Figure 5:
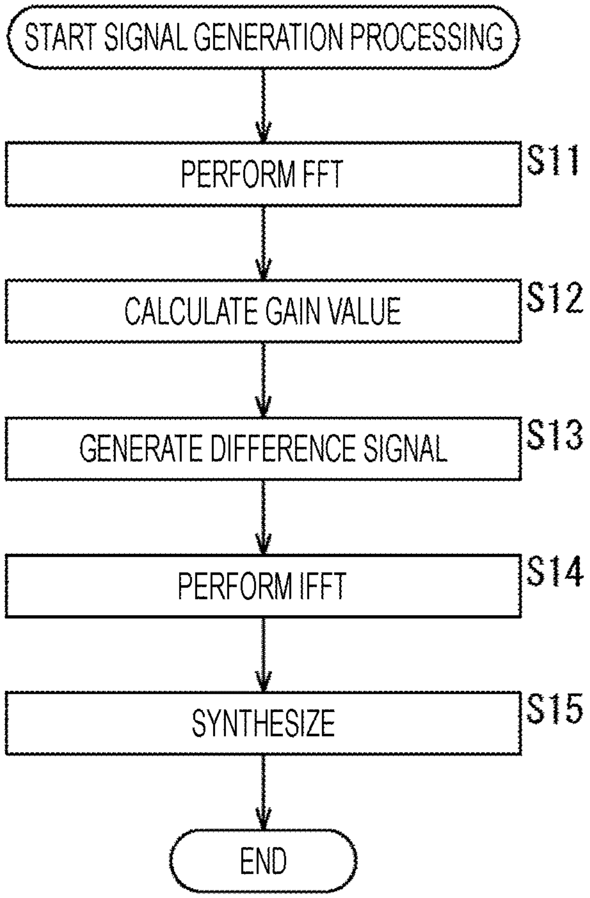
FIG. 5 is a flowchart for describing signal generation processing.

Note that processing of step S41 similar to the processing of step S11 of FIG. 5, and thus a description thereof will be omitted.

In step S42, the gain calculation unit 22 calculates a gain value on the basis of the supplied metadata, the prediction coefficient held in advance, and a signal obtained by the FFT, which is supplied from the FFT processing unit 21, and supplies the gain value to the difference signal generation unit 23.

Specifically, the gain calculation unit 22 selects, from among the plurality of prediction coefficients held in advance, a prediction coefficient defined for a combination of the compression coding method, the bit rate, and the genre indicated by the compression coding method information, the bit rate information, and the genre information included in the supplied metadata, and reads out the prediction coefficient.

The gain calculation unit 22 then performs processing similar to the processing of step S12 of FIG. 5 on the basis of the read-out prediction coefficient and the signal supplied from the FFT processing unit 21 to calculate the gain value.

When the gain value is calculated, processing of steps S43 to S45 is performed thereafter to end the signal generation processing, but the processing is similar to the processing of steps S13 to S15 of FIG. 5, and thus a description thereof will be omitted.

As described above, the signal processing device 51 selects, on the basis of the metadata, the appropriate prediction coefficient from among the plurality of prediction coefficients held in advance, and improves the sound quality of the input compressed sound source signal by using the selected prediction coefficient.

By adopting such a configuration, it is possible to select, for each genre or the like, the appropriate prediction coefficient on the decoding side, and to improve accuracy in predicting the envelope of the frequency characteristics of the difference signal. As a result, it is possible to obtain a high-quality sound signal with high sound quality, which is closer to the original sound signal.

Third Embodiment

Configuration Example of Signal Processing Device

Furthermore, the characteristics of the envelope obtained by prediction may be added to the excitation signal obtained, as described above, by performing the sound quality improvement processing on the input compressed sound source signal, so that the difference signal may be obtained.

Figure 8:
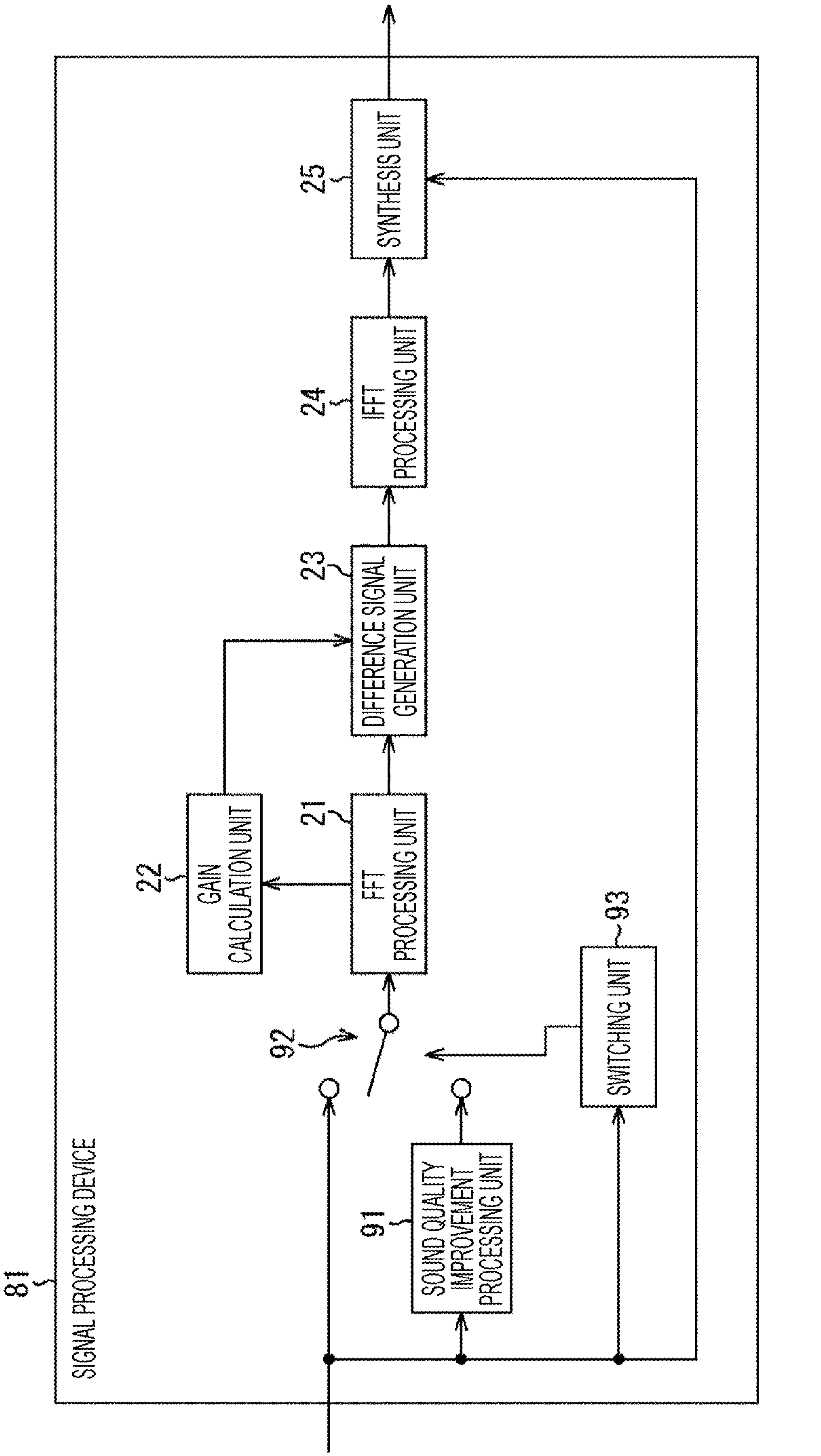
FIG. 8 is a diagram illustrating a configuration of a signal processing device.

In such a case, a signal processing device is configured as illustrated in FIG. 8, for example. Note that, in FIG. 8, the same reference signs are given to parts corresponding to the parts in the case of FIG. 4, and a description thereof will be omitted as appropriate.

A signal processing device 81 illustrated in FIG. 8 includes a sound quality improvement processing unit 91, a switch 92, a switching unit 93, an FFT processing unit 21, a gain calculation unit 22, a difference signal generation unit 23, an IFFT processing unit 24, and a synthesis unit 25.

A configuration of the signal processing device 81 is such a configuration that the sound quality improvement processing unit 91, the switch 92, and the switching unit 93 are newly provided in addition to the configuration of the signal processing device 11.

The sound quality improvement processing unit 91 performs the sound quality improvement processing of improving the sound quality, such as adding a reverb component (reverberation component), on the supplied input compressed sound source signal, and supplies, to the switch 92, the excitation signal obtained as a result of the sound quality improvement processing.

For example, the sound quality improvement processing by the sound quality improvement processing unit 91 can be multi-stage filtering processing by a plurality of cascade-connected all-pass filters, processing combining the multi-stage filtering processing and the gain adjustment, or the like.

The switch 92 operates according to the control of the switching unit 93, and switches an input source of a signal supplied to the FFT processing unit 21.

That is, the switch 92 selects either the supplied input compressed sound source signal or the excitation signal supplied from the sound quality improvement processing unit 91 according to the control of the switching unit 93, and supplies the selected signal to the subsequent FFT processing unit 21.

The switching unit 93 controls the switch 92 on the basis of the supplied input compressed sound source signal to switch between generating the difference signal on the basis of the input compressed sound source signal and generating the difference signal on the basis of the excitation signal.

Note that, although an example in which the switch 92 and the sound quality improvement processing unit 91 are provided in front of the FFT processing unit 21 has been described here, the switch 92 and the sound quality improvement processing unit 91 may be provided after the FFT processing unit 21, that is, between the FFT processing unit 21 and the difference signal generation unit 23. In such a case, the sound quality improvement processing unit 91 performs the sound quality improvement processing on a signal obtained by the FFT.

Furthermore, in the signal processing device 81 as well, metadata may be supplied to the gain calculation unit 22 as in the case of the signal processing device 51.

Description of Signal Generation Processing

Next, signal generation processing performed by the signal processing device 81 will be described with reference to a flowchart of FIG. 9.

In step S71, the switching unit 93 determines whether or not to perform the sound quality improvement processing on the basis of the supplied input compressed sound source signal.

Specifically, for example, the switching unit 93 specifies whether the supplied input compressed sound source signal is a transient signal or a stationary signal.

Here, for example, in a case where the input compressed sound source signal is an attack signal, the input compressed sound source signal is determined to be the transient signal, and in a case where the input compressed sound source signal is not the attack signal, the input compressed sound source signal is determined to be the stationary signal.

In the case where the supplied input compressed sound source signal is determined to be the transient signal, the switching unit 93 determines that the sound quality improvement processing is not performed. On the other hand, when the supplied input compressed sound source signal is not the transient signal, that is, it is the stationary signal, the switching unit 93 determines that the sound quality improvement processing is performed.

In the case where it is determined in step S71 that the sound quality improvement processing is not performed, the switching unit 93 controls the operation of the switch 92 so that the input compressed sound source signal is supplied to the FFT processing unit 21 as it is, and then the processing proceeds to step S73.

On the other hand, in the case where it is determined in step S71 that the sound quality improvement processing is performed, the switching unit 93 controls the operation of the switch 92 so that the excitation signal is supplied to the FFT processing unit 21, and then the processing proceeds to step S72. In this case, the switch 92 is connected to the sound quality improvement processing unit 91.

In step S72, the sound quality improvement processing unit 91 performs the sound quality improvement processing on the supplied input compressed sound source signal, and supplies the excitation signal obtained as a result of the sound quality improvement processing to the FFT processing unit 21 via the switch 92.

If the processing of step S72 is performed or it is determined that the sound quality improvement processing is not performed in step S71, processing of steps S73 to S77 is performed thereafter to end the signal generation processing, but the processing is similar to the processing of steps S11 to S15 of FIG. 5, and thus a description thereof will be omitted.

However, in step S73, the FFT is performed on the excitation signal or the input compressed sound source signal supplied from the switch 92.

As described above, the signal processing device 81 appropriately performs the sound quality improvement processing on the input compressed sound source signal, and generates the difference signal on the basis of the excitation signal obtained by the sound quality improvement processing or the input compressed sound source signal and the prediction coefficient held in advance. By adopting such a configuration, it is possible to obtain a high-quality sound signal with even higher sound quality.

Figure 9:
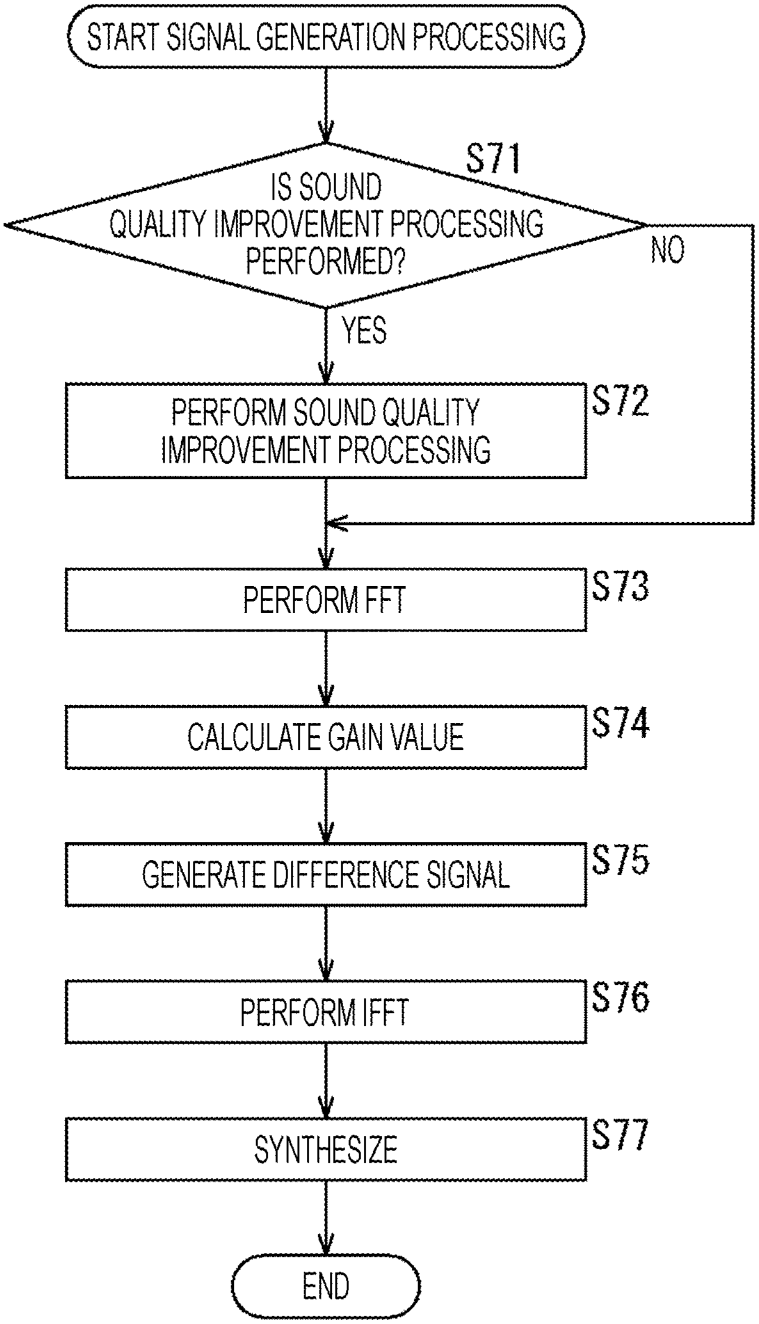
FIG. 9 is a flowchart for describing signal generation processing.
Figure 10:
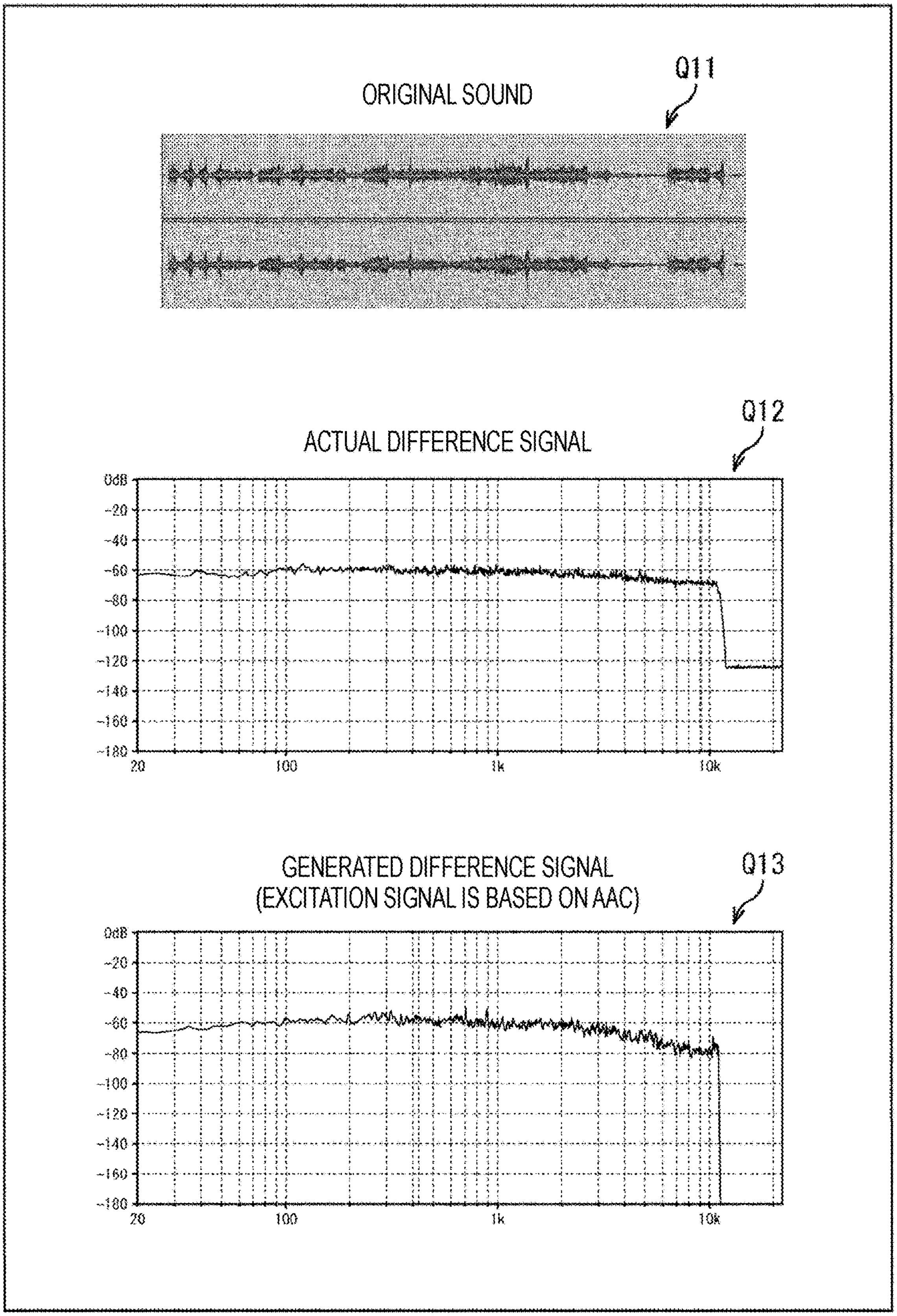
FIG. 10 is a diagram for describing an example of generating a difference signal.
Figure 11:
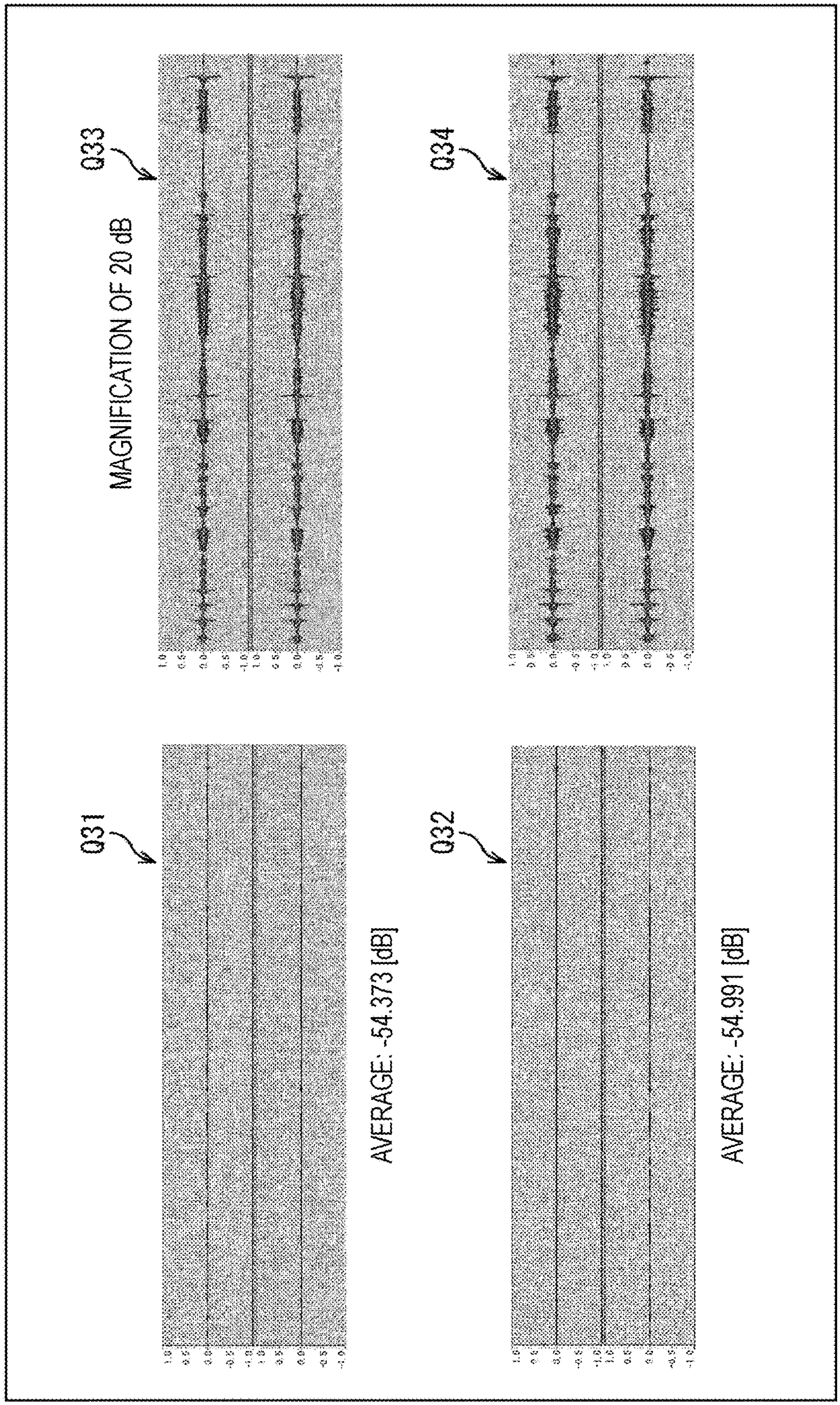
FIG. 11 is a diagram for describing an example of generating the difference signal.

Here, FIGS. 10 and 11 illustrate an example in which the signal generation processing described with reference to FIG. 9 is performed on an input compressed sound source signal obtained from an actual music signal.

A part indicated by an arrow Q11 in FIG. 10 illustrates original sound signals of L and R channels. Note that, in the part indicated by the arrow Q11, the horizontal axis indicates time and the vertical axis indicates a signal level.

When a difference between such original sound signals indicated by the arrow Q11 and an input compressed sound source signal is actually obtained, a difference signal indicated by an arrow Q12 is obtained.

Furthermore, when the signal generation processing described with reference to FIG. 9 is performed using, as an input, the input compressed sound source signal obtained from the original sound signals indicated by the arrow Q11, a difference signal indicated by an arrow Q13 is obtained. Here, an example is shown in which the sound quality improvement processing is not performed in the signal generation processing.

In the parts indicated by the arrows Q12 and Q13, the horizontal axis indicates a frequency and the vertical axis indicates a gain. It can be seen that frequency characteristics of the actual difference signal indicated by the arrow Q12 and those of the difference signal generated by prediction, which is indicated by the arrow Q13, are substantially the same in a low frequency band range.

Furthermore, a part indicated by an arrow Q31 in FIG. 11 illustrates difference signals of the L and R channels in the time domain, which correspond to the difference signal illustrated by the arrow Q12 in FIG. 10. Moreover, a part indicated by an arrow Q32 in FIG. 11 illustrates difference signals of the L and R channels in the time domain, which correspond to the difference signal illustrated by the arrow Q13 in FIG. 10. Note that, in FIG. 11, the horizontal axis indicates time and the vertical axis indicates a signal level.

The difference signals indicated by the arrow Q31 have an average signal level of −54.373 dB, and the difference signals indicated by the arrow Q32 have an average signal level of −54.991 dB.

Furthermore, a part indicated by an arrow Q33 illustrates signals obtained by multiplying, by 20 dB, the difference signals indicated by the arrow Q31 to magnify the difference signals, and a part indicated by an arrow Q34 illustrates signals obtained by multiplying, by 20 dB, the difference signals indicated by the arrow Q32 to magnify the difference signals.

It can be seen from the parts indicated by the arrows Q31 to Q34 that the signal processing device 81 can make a prediction with an error of about 0.6 dB even for a small signal of about −55 dB on average. That is, it can be seen that a difference signal equivalent to the actual difference signal can be generated by prediction.

Fourth Embodiment

Configuration Example of Signal Processing Device

Furthermore, the high-quality sound signal obtained by the present technology may be used as a low frequency signal, and the band expansion processing of adding a high frequency component (high frequency signal) to the low frequency signal may be performed to generate a signal including the high frequency component as well.

If the above-described high-quality sound signal is used as the excitation signal in the band expansion processing, the excitation signal used in the band expansion processing has higher sound quality, that is, is closer to the original signal.

Therefore, a signal closer to the original sound signal can be obtained by a synergistic effect of the processing of generating the high-quality sound signal obtained by improving the sound quality of a low frequency signal and the addition of the high frequency component by the band expansion processing using the high-quality sound signal.

Figure 12:
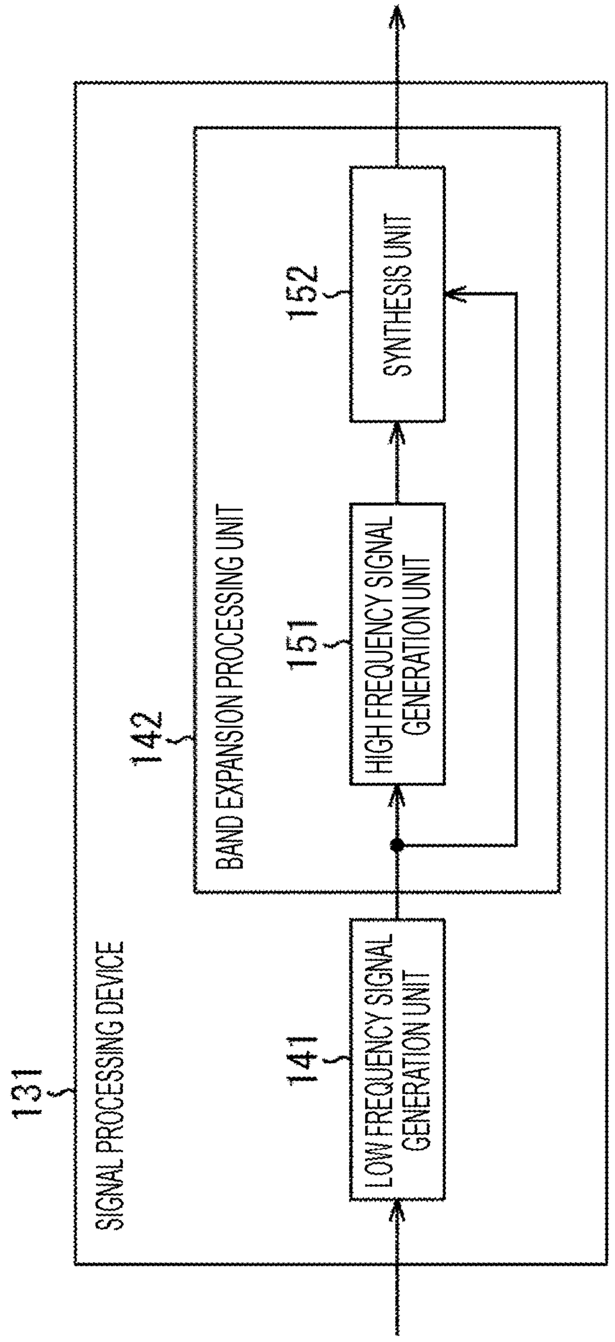
FIG. 12 is a diagram illustrating a configuration of a signal processing device.

In a case where the band expansion processing is performed on the high-quality sound signal in this way, a signal processing device is configured as illustrated in FIG. 12, for example.

A signal processing device 131 illustrated in FIG. 12 includes a low frequency signal generation unit 141 and a band expansion processing unit 142.

The low frequency signal generation unit 141 generates the low frequency signal on the basis of a supplied input compressed sound source signal, and supplies the low frequency signal to the band expansion processing unit 142.

Here, the low frequency signal generation unit 141 has the same configuration as the signal processing device 81 illustrated in FIG. 8, and generates the high-quality sound signal as the low frequency signal.

That is, the low frequency signal generation unit 141 includes a sound quality improvement processing unit 91, a switch 92, a switching unit 93, an FFT processing unit 21, a gain calculation unit 22, a difference signal generation unit 23, an IFFT processing unit 24, and a synthesis unit 25.

Note that a configuration of the low frequency signal generation unit 141 is not limited to the same configuration as that of the signal processing device 81, and may be the same configuration as that of the signal processing device 11 or the signal processing device 51.

The band expansion processing unit 142 performs the band expansion processing of generating, by prediction, a high frequency signal (high frequency component) from the low frequency signal obtained by the low frequency signal generation unit 141, and synthesizing the obtained high frequency signal and the low frequency signal.

The band expansion processing unit 142 includes a high frequency signal generation unit 151 and a synthesis unit 152.

The high frequency signal generation unit 151 generates, by prediction calculation, the high frequency signal as a high frequency component of the original sound signal on the basis of the low frequency signal supplied from the low frequency signal generation unit 141 and a predetermined coefficient held in advance, and supplies, to the synthesis unit 152, the high frequency signal as a result of the prediction calculation.

The synthesis unit 152 synthesizes the low frequency signal supplied from the low frequency signal generation unit 141 and the high frequency signal supplied from the high frequency signal generation unit 151 to generate and output, as a final high-quality sound signal, a signal containing a low frequency component and a high frequency component.

Description of Signal Generation Processing

Figure 13:
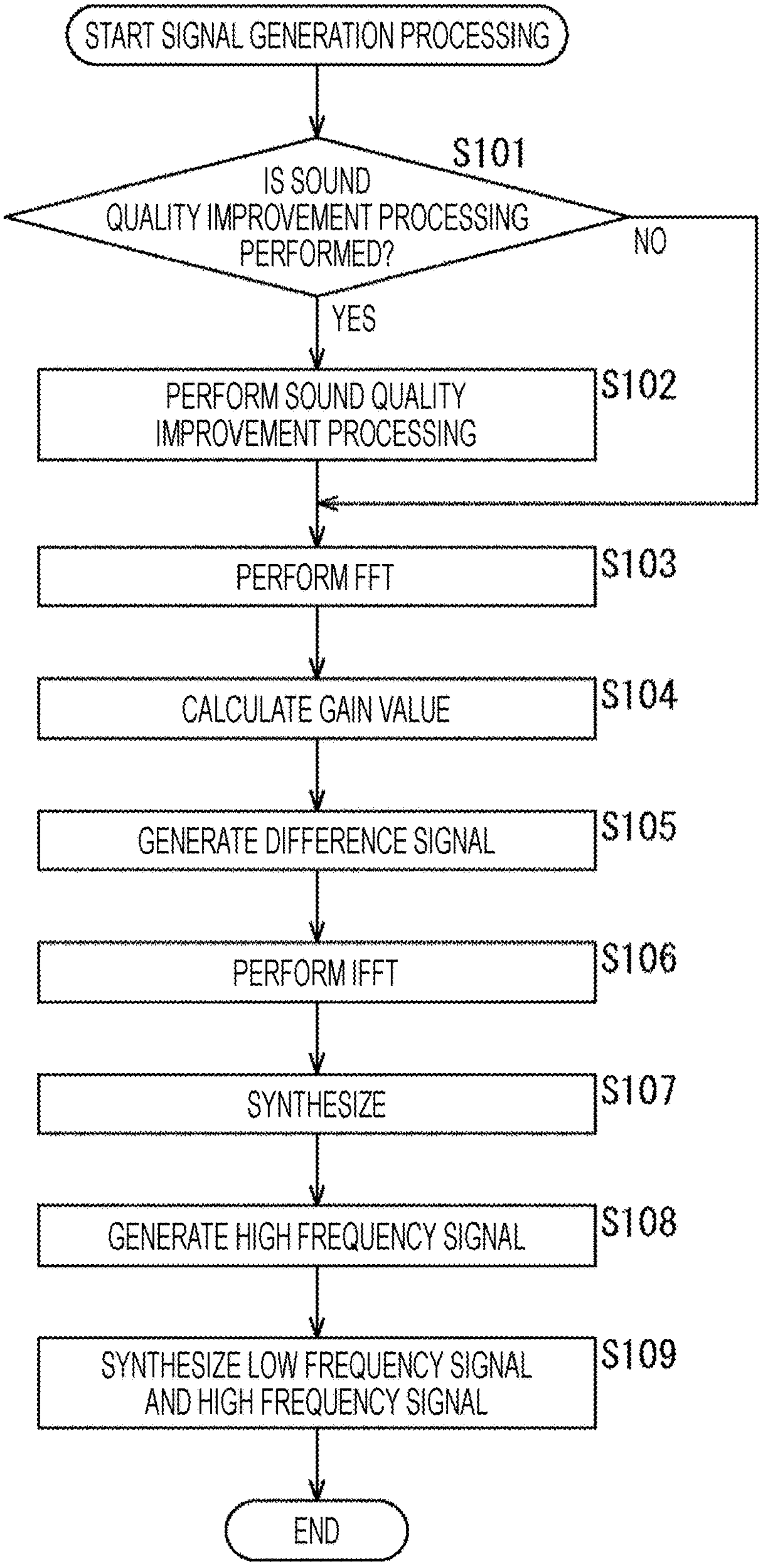
FIG. 13 is a flowchart for describing signal generation processing.

Next, signal generation processing performed by the signal processing device 131 will be described with reference to a flowchart of FIG. 13.

When the signal generation processing is started, processing of steps S101 to S107 is performed to generate the low frequency signal, but the processing is similar to the processing of steps S71 to S77 in FIG. 9, and thus a description thereof will be omitted.

In particular, in steps S101 to S107, the input compressed sound source signal is targeted, and the processing is performed on the zeroth to 35th SFBs among the SFBs indicated by the index n, so that a signal in a frequency band including these SFBs (low frequency band) is generated as the low frequency signal.

In step S108, the high frequency signal generation unit 151 generates the high frequency signal on the basis of the low frequency signal supplied from the synthesis unit 25 of the low frequency signal generation unit 141 and the predetermined coefficient held in advance, and supplies the high frequency signal to the synthesis unit 152.

In particular, in step S108, a signal in a frequency band including 36th to 48th SFBs (high frequency band) among the SFBs indicated by the index n is generated as the high frequency signal.

In step S109, the synthesis unit 152 synthesizes the low frequency signal supplied from the synthesis unit 25 of the low frequency signal generation unit 141 and the high frequency signal supplied from the high frequency signal generation unit 151 to generate the final high-quality sound signal, and outputs the final high-quality sound signal to a subsequent stage. When the final high-quality sound signal is output in this way, the signal generation processing ends.

As described above, the signal processing device 131 generates the low frequency signal using a prediction coefficient obtained by machine learning, generates the high frequency signal from the low frequency signal, and synthesizes the low frequency signal and the high frequency signal to obtain the final high-quality sound signal. By adopting such a configuration, it is possible to predict components in a wide band from the low frequency band to the high frequency band with high accuracy and obtain a signal with higher sound quality.

Configuration Example of Computer

Incidentally, the series of processing described above can be executed by hardware or software. In a case where the series of processing is executed by software, a program constituting the software is installed in a computer. Here, the computer includes a computer embedded in dedicated hardware, a general-purpose personal computer, for example, capable of executing various functions by installing various programs, and the like.

Figure 14:
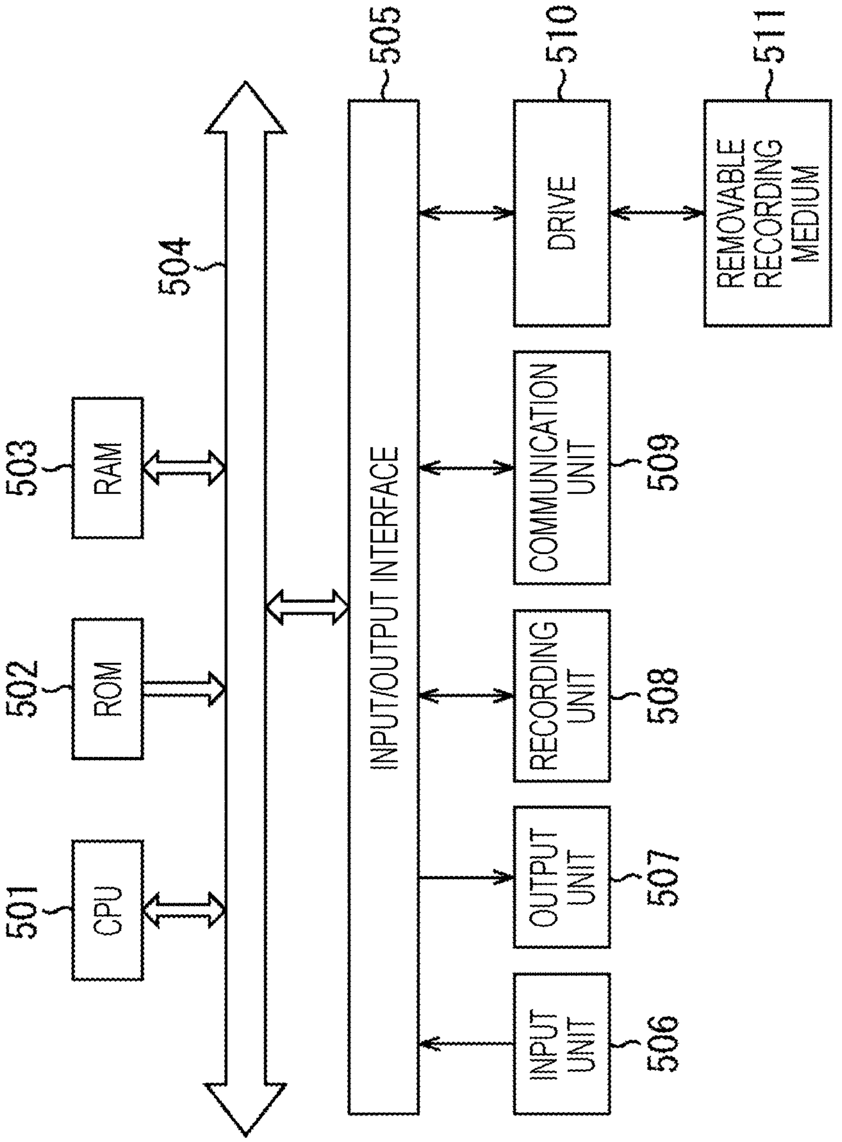
FIG. 14 is a diagram illustrating a configuration example of a computer.

FIG. 14 is a block diagram illustrating a configuration example of the hardware of the computer that executes the series of processing described above by the program.

In the computer, a central processing unit (CPU) 501, a read only memory (ROM) 502, and a random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads the program recorded in the recording unit 508 into the RAM 503 via the input/output interface 505 and the bus 504 and executes the program to perform the series of processing described above.

The program executed by the computer (CPU 501) can be recorded and provided on the removable recording medium 511 as a package medium or the like, for example. The program can also be provided via a wired or wireless transmission medium such as a local area network, the Internet, or digital satellite broadcasting.

In the computer, the program can be installed in the recording unit 508 via the input/output interface 505 by the removable recording medium 511 being mounted on the drive 510. Furthermore, the program can be received by the communication unit 509 via the wired or wireless transmission medium and installed in the recording unit 508. In addition, the program can be installed in advance in the ROM 502 or the recording unit 508.

Note that the program executed by the computer may be a program in which the processing is performed in time series in the order described in the present specification, or may be a program in which the processing is performed in parallel or at a necessary timing such as when a call is made.

Furthermore, embodiments of the present technology are not limited to the above-described embodiments, and various modifications can be made without departing from the gist of the present technology.

For example, the present technology can take a configuration of cloud computing in which one function is shared and processed together by a plurality of devices via a network.

Furthermore, each step described in the above-described flowcharts can be executed by one device or shared and executed by a plurality of devices.

Moreover, in a case where one step includes a plurality of sets of processing, the plurality of sets of processing included in the one step can be executed by one device or shared and executed by a plurality of devices.

Furthermore, the present technology can also have the following configurations.

(1)

A signal processing device including:

a calculation unit that calculates a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal;

a difference signal generation unit that generates the difference signal on the basis of the parameter and the input compressed sound source signal; and a synthesis unit that synthesizes the generated difference signal and the input compressed sound source signal.

(2)

The signal processing device according to (1), in which the parameter is a gain of a frequency envelope of the difference signal.

(3)

The signal processing device according to (1) or (2), in which the learning is machine learning.

(4)

The signal processing device according to any one of (1) to (3), in which the difference signal generation unit generates the difference signal on the basis of an excitation signal and the parameter, the excitation signal being obtained by performing sound quality improvement processing on the input compressed sound source signal.

(5)

The signal processing device according to (4), in which the sound quality improvement processing is filtering processing by an all-pass filter.

(6)

The signal processing device according to (4) or (5), further including a switching unit that switches between generating the difference signal on the basis of the input compressed sound source signal and generating the difference signal on the basis of the excitation signal.

(7)

The signal processing device according to any one of (1) to (6), in which the calculation unit selects, from among a plurality of the prediction coefficients learned for each type of sound based on the original sound signal, for each method of compressing and coding the original sound signal, or for each bit rate after compressing and coding the original sound signal, a prediction coefficient according to a type of sound, a compression coding method, or a bit rate of the input compressed sound source signal, and calculates the parameter on the basis of the selected prediction coefficient and the input compressed sound source signal.

(8)

The signal processing device according to any one of (1) to (7), further including a band expansion processing unit that performs, on the basis of a high-quality sound signal obtained by the synthesis, band expansion processing of adding a high frequency component to the high-quality sound signal.

(9)

A signal processing method performed by a signal processing device, the signal processing method including:

calculating a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal;

generating the difference signal on the basis of the parameter and the input compressed sound source signal; and synthesizing the generated difference signal and the input compressed sound source signal.

(10)

A program that causes a computer to execute processing including steps of:

calculating a parameter for generating a difference signal corresponding to an input compressed sound source signal on the basis of a prediction coefficient and the input compressed sound source signal, the prediction coefficient being obtained by learning using, as training data, a difference signal between an original sound signal and a learning compressed sound source signal obtained by compressing and coding the original sound signal;

generating the difference signal on the basis of the parameter and the input compressed sound source signal; and synthesizing the generated difference signal and the input compressed sound source signal.

REFERENCE SIGNS LIST

11 Signal processing device
21 FFT processing unit
22 Gain calculation unit
23 Difference signal generation unit
24 IFFT processing unit
25 Synthesis unit
91 Sound quality improvement processing unit
92 Switch
93 Switching unit
141 Low frequency signal generation unit
142 Band expansion processing unit
151 High frequency signal generation unit
152 Synthesis unit

The invention claimed is:

1. A signal processing device for generating an output sound signal from an original sound signal, the output sound signal having a higher quality than the original sound signal, comprising:

a sound quality improvement processing unit configured to receive an input compressed sound source signal, to compute an excitation signal from the input compressed sound source signal, and to output the excitation signal;

a switching unit configured to receive the input compressed sound source signal and to control a switch to connect to either the input compressed sound source signal or the excitation signal and to output either the input compressed sound source signal or the excitation signal;

a fast fourier transform processing unit electrically connected to the switch and configured to compute a fast fourier transform from either the input compressed sound source signal or the excitation signal depending on a configuration of the switch;

a calculation unit electrically connected to the fast fourier transform processing unit and configured to calculate a parameter for generating a difference signal corresponding to an input compressed sound source signal on a basis of a prediction coefficient and the fast fourier transform from the input compressed sound source signal, the prediction coefficient being obtained by learning using, as training data, a difference signal between an original sound signal and a learning compressed sound source signal obtained by compressing and coding the original sound signal;

a difference signal generation unit electrically connected to the fast fourier transform processing unit and the calculation unit, and configured to generate the difference signal on a basis of the parameter and the fast fourier transform;

an inverse fast fourier transform unit electrically connected to the difference signal generation unit and configured to compute an inverse fast fourier transform from the difference signal; and a synthesis unit electrically connected to the inverse fast fourier transform unit and configured to receive the input compressed source signal and to synthesize the inverse fast fourier transform of the generated difference signal and the input compressed sound source signal to generate the output sound signal with the higher quality than the original sound signal.

2. The signal processing device according to claim 1, wherein the parameter is a gain of a frequency envelope of the difference signal.

3. The signal processing device according to claim 1, wherein the learning is machine learning.

4. The signal processing device according to claim 1, wherein the difference signal generation unit generates the difference signal on a basis of the excitation signal and the parameter, the excitation signal being obtained by performing sound quality improvement processing on the input compressed sound source signal.

5. The signal processing device according to claim 4, wherein the sound quality improvement processing is filtering processing by an all-pass filter.

6. The signal processing device according to claim 4 wherein the switching unit is configured to switch between generating the difference signal on a basis of the fast fourier transform from the input compressed sound source signal and generating the difference signal on a basis of the excitation signal.

7. The signal processing device according to claim 1, wherein the calculation unit selects, from among a plurality of the prediction coefficients learned for each type of sound based on the original sound signal, for each method of compressing and coding the original sound signal, or for each bit rate after compressing and coding the original sound signal, a prediction coefficient according to a type of sound, a compression coding method, or a bit rate of the input compressed sound source signal, and calculates the parameter on a basis of the selected prediction coefficient and the input compressed sound source signal.

8. The signal processing device according to claim 1, further comprising a band extension processing unit configured to perform, on a basis of a high-quality sound signal obtained by the synthesis, band expansion processing of adding a high frequency component to the high-quality sound signal.

9. A signal processing method performed by a signal processing device for generating an output sound signal from an original sound signal, the output sound signal having a higher quality than the original sound signal, the signal processing method comprising:

receiving an input compressed sound source signal and computing an excitation signal from the input compressed sound source signal;

controlling a switch to connect to either the input compressed sound source signal or the excitation signal and to output either the input compressed sound source signal or the excitation signal;

computing a fast fourier transform from either the input compressed sound source signal or the excitation signal depending on a configuration of the switch;

calculating a parameter for generating a difference signal corresponding to an input compressed sound source signal on a basis of a prediction coefficient and the fast fourier transform from the input compressed sound source signal, the prediction coefficient being obtained by learning using, as training data, a difference signal between an original sound signal and a learning compressed sound source signal obtained by compressing and coding the original sound signal;

generating the difference signal on a basis of the parameter and the fast fourier transform;

computing an inverse fast fourier transform from the difference signal; and synthesizing the inverse fast fourier transform of the generated difference signal and the input compressed sound source signal to generate the output sound signal with the higher quality than the original sound signal.

10. A non-transitory computer-readable storage medium storing instructions that, when executed, causes a computer to perform a method for generating an output sound signal from an original sound signal, the output sound signal having a higher quality than the original sound signal, the method comprising:

receiving an input compressed sound source signal and computing an excitation signal from the input compressed sound source signal;

controlling a switch to connect to either the input compressed sound source signal or the excitation signal and to output either the input compressed sound source signal or the excitation signal;

computing a fast fourier transform from either the input compressed sound source signal or the excitation signal depending on a configuration of the switch;

calculating a parameter for generating a difference signal corresponding to an input compressed sound source signal on a basis of a prediction coefficient and the fast fourier transform from the input compressed sound source signal, the prediction coefficient being obtained by learning using, as training data, a difference signal between an original sound signal and a learning compressed sound source signal obtained by compressing and coding the original sound signal;

generating the difference signal on a basis of the parameter and the fast fourier transform;

computing an inverse fast fourier transform from the difference signal; and synthesizing the inverse fast fourier transform of the generated difference signal and the input compressed sound source signal to generate the output sound signal with the higher quality than the original sound signal.

* * * * *